US007479199B2

(12) United States Patent
Ray, III et al.

(10) Patent No.: US 7,479,199 B2
(45) Date of Patent: Jan. 20, 2009

(54) METHOD OF MAKING A PAPERBACK RIDER INSTANTLY REDEEMABLE COUPON

(75) Inventors: Thomas D. Ray, III, Birmingham, AL (US); Steve A. Posey, Birmingham, AL (US); Robert J. Alden, Birmingham, AL (US)

(73) Assignee: RayPress Corporation, Birmingham, AL (US)

( * ) Notice: Subject to any disclaimer, the term of this patent is extended or adjusted under 35 U.S.C. 154(b) by 532 days.

(21) Appl. No.: 11/131,317

(22) Filed: May 18, 2005

(65) Prior Publication Data

US 2005/0208253 A1 Sep. 22, 2005

(51) Int. Cl.
*B31F 1/00* (2006.01)
*B32B 38/04* (2006.01)

(52) U.S. Cl. ........................ 156/204; 156/227; 156/252

(58) Field of Classification Search ....................... None
See application file for complete search history.

(56) References Cited

U.S. PATENT DOCUMENTS 3,863,369 A 2/1975 Kinne
4,479,838 A 10/1984 Dunsirn et al.
4,621,837 A 11/1986 Mack
4,767,654 A 8/1988 Riggsbee
4,872,707 A 10/1989 deBruin
4,991,878 A 2/1991 Cowan et al.
5,019,436 A 5/1991 Schramer et al.
5,074,595 A 12/1991 Hill et al.
5,127,676 A 7/1992 Bockairo
5,174,605 A 12/1992 Instance
5,263,743 A 11/1993 Jones
5,284,363 A 2/1994 Gartner et al.
5,308,119 A 5/1994 Roshkoff
5,413,384 A 5/1995 Principe et al.
5,489,123 A 2/1996 Roshkoff
5,571,358 A * 11/1996 Napier et al. ............... 156/227
5,587,222 A 12/1996 Hoffman
5,674,334 A * 10/1997 Instance ...................... 156/64
5,727,819 A 3/1998 Grosskopf et al.
5,736,210 A 4/1998 Treleaven
5,766,716 A 6/1998 Barry
5,846,623 A 12/1998 Denny
5,975,582 A 11/1999 Treleaven
6,027,598 A 2/2000 Anderson
6,027,780 A 2/2000 Treleaven et al.
6,042,149 A 3/2000 Roshkoff
6,057,019 A 5/2000 Barry
6,254,137 B1 7/2001 Baum, Jr. et al.
6,329,034 B1 12/2001 Pendry et al.

(Continued)

*Primary Examiner*—Richard Crispino
*Assistant Examiner*—Barbara J. Musser
(74) *Attorney, Agent, or Firm*—Dykema Gossett PLLC

(57) ABSTRACT

The present invention discloses a paperback rider instantly redeemable coupon (IRC) including a booklet disposed on a liner having an adhesive backing layer, a first clear film laminate disposed on the booklet, and an IRC having a second clear film laminate disposed thereon. The IRC may be releasably affixed to the first clear film laminate by perforations. The invention further includes a paperback rider instantly redeemable coupon (IRC) including, a booklet disposed on a liner having an adhesive backing layer, a clear film laminate disposed on the booklet, and an IRC releasably affixed to the first clear film laminate by clean release adhesive. The invention also provides a method of manufacturing the paperback rider instantly redeemable coupons (IRC) described above.

11 Claims, 3 Drawing Sheets

U.S. PATENT DOCUMENTS

| | | | | |
|---|---|---|---|---|
| 6,352,751 | B1 | 3/2002 | Miles et al. | |
| 6,413,345 | B1 | 7/2002 | Treleaven | |
| 6,432,500 | B1 | 8/2002 | Jones et al. | |
| 7,077,435 | B1 * | 7/2006 | Cowan | 283/81 |
| 2001/0040371 | A1 | 11/2001 | Dahlquist | |
| 2001/0045741 | A1 | 11/2001 | Shacklett et al. | |
| 2001/0052386 | A1 | 12/2001 | Treleaven et al. | |
| 2002/0043798 | A1 | 4/2002 | Engel | |

* cited by examiner

METHOD OF MAKING A PAPERBACK RIDER INSTANTLY REDEEMABLE COUPON

RELATED APPLICATIONS

This application claims benefit of priority of Provisional Application Ser. No. 60/415,781, filed Oct. 4, 2002, and further claims the priority of parent application Ser. No. 10/642,227, filed Aug. 18, 2003.

BACKGROUND OF INVENTION a. Field of Invention

The invention relates generally to a label and a manufacturing method thereof, and, more particularly to a label and booklet combination in which the label and the booklet may be releasably affixed to a product, and a manufacturing method thereof.

b. Description of Related Art

Flexographic printing of multi-page booklet or leaflet labels affixed to a carrier web is well known in the industry. The web or roll of finished booklet labels can be automatically applied by a machine to numerous products or product packaging. The printed material may include recipes, instructions, warnings, mail-in promotions and the like. After application thereof, the booklet can be conveniently removed from the product or package by a consumer without defacing the surface thereof or leaving the underlying surface obscured.

Flexographic printing of an Instantly Redeemable Coupon (IRC), which can also be machine applied to a product or product packaging for convenient removal by a cashier at the checkout counter, is also well known in the industry.

The current industry however lacks combination labels, which include an IRC on top of a booklet or leaflet label. Regardless of how IRCs, booklets or leaflet labels are printed and manufactured, the application of an IRC to a booklet or leaflet label has presented obstacles in the industry thus far.

As an alternative to being placed on top of a booklet or leaflet label, an IRC may be included inside a leaflet label. However, use of such an IRC would necessitate opening the leaflet at the checkout counter by a cashier, thus risking damage, removal or loss of the booklet or leaflet label. This would also defeat the advertiser's purpose if the leaflet becomes damaged or lost, and further create an inconvenience for the cashier and the consumer.

For the alternative of placing an IRC inside a leaflet label discussed above, mail-in coupons, future purchase redemption coupons and sweepstake entry blanks placed inside a booklet or leaflet label are common and are somewhat effective at promoting a particular product or brand. However, these alternatives do not carry the impact of "point of purchase" consumer gratification and brand loyalty associated with an IRC.

It is apparent that an IRC and a booklet label can be manually affixed to a product or package. This approach however takes up additional space on the product or package, and significantly increases the time required for manufacturing the end-product.

Specifically, in the "manual application" scheme discussed above, the IRCs and booklet labels must be produced on different presses or a single press must be reconfigured for the separate production thereof. Producing separate IRCs and booklet labels also requires additional materials because each label must have its own carrier web and release mechanism. Separate IRCs and booklet labels on separate rolls also add bulk and weight, thereby increasing packing and shipping costs. Lastly, using separate IRCs and booklet labels requires separate application to the product or package, thereby necessitating two applying stations and two applications on a user's production line.

SUMMARY OF INVENTION

The present invention solves the problems and overcomes the drawbacks and disadvantages of the prior art by providing an apparatus and method for flexographic printing of a booklet or leaflet label affixed to a conventional carrier web by conventional means, the flexographic printing of an IRC, the affixing of the IRC to the top surface of the booklet or leaflet label, the die cutting of the combined piece, and waste matrix removal and perforation of the combined die cut piece, all in one pass through a flexographic in-line press.

Specifically, the present invention provides a paperback rider instantly redeemable coupon (IRC) including a liner having inner and outer sections on a first face thereof and a booklet including first and second surfaces. The first surface of the booklet may be disposed substantially adjacent the inner section on the first face of the liner. The paperback rider IRC further includes a first laminate adhesively affixed to the second surface of the booklet. The first laminate may include inner and outer sections on first and second faces thereof. The inner section of the first face of the first laminate may be affixed to the booklet. The outer section of the first face of the first laminate may be affixed to the outer section of the liner to substantially enclose the booklet between the first laminate and the liner. The paperback rider IRC may further include an IRC disposed substantially adjacent the inner section on the second face of the first laminate and having a second laminate adhesively affixed thereon. The second laminate may include inner and outer sections on a first face thereof. The inner section of the second laminate may be affixed to the IRC and the outer section of the second laminate may be affixed to the outer section of the second face of the first laminate.

For the paperback rider IRC described above, the liner and the first and second laminates may be transparent. The liner may include a second face having an adhesive layer. The outer sections of the liner and the first and second laminates may include perforations for permitting separation of the IRC from the paperback rider IRC. The IRC may be a coupon, a game-piece, an instant winner coupon, a warning, a scratch-off piece, a warranty, instructions, description, or a collectible sticker.

The invention further provides a paperback rider IRC including a liner having inner, and outer sections on a first face thereof and a booklet including first and second surfaces. The first surface of the booklet may be disposed substantially adjacent the inner section on the first face of the liner. The paperback rider IRC may further include a laminate adhesively affixed to the second surface of the booklet. The laminate may include inner and outer sections on a first face thereof. The inner section of the first face of the laminate may be affixed to the booklet. The outer section of the first face of the laminate may be affixed to the outer section of the liner to substantially enclose the booklet between the laminate and the liner. An IRC may be disposed on a second face of the laminate and releasably affixed thereto by a dry release adhesive for permitting separation of the IRC from the paperback rider IRC. The IRC may have a surface area substantially smaller than a surface area of the booklet.

The invention yet further provides a method of manufacturing a paperback rider instantly redeemable coupon (IRC). The method may include placing a booklet on a first face of a liner including inner and outer sections on the first face. The booklet may include first and second surfaces. The first surface of the booklet may be disposed substantially adjacent the inner section on the first face of the liner. The method may further include adhesively affixing a first laminate to the second surface of the booklet. The first laminate may include inner and outer sections on first and second faces thereof. The inner section of the first face of the first laminate may be affixed to the booklet. The outer section of the first face of the first laminate may be affixed to the outer section of the liner to substantially enclose the booklet between the first laminate and the liner. The method may further include disposing an IRC substantially adjacent the inner section on the second face of the first laminate, and adhesively affixing a second laminate on the IRC. The second laminate may include inner and outer sections on a first face thereof. The inner section of the second laminate may be affixed to the IRC and the outer section of the second laminate may be affixed to the outer section of the second face of the first laminate.

For the method described above, the liner may include a second face having an adhesive layer. The method may further include perforating the outer sections of the liner and first and second laminates for permitting separation of the IRC from the paperback rider IRC.

The invention further provides a method of manufacturing a paperback rider instantly redeemable coupon (IRC). The method may include placing a booklet on a first face of a liner including inner and outer sections on the first face. The booklet may include first and second surfaces. The first surface of the booklet may be disposed substantially adjacent the inner section on the first face of the liner. The method may further include adhesively affixing a laminate to the second surface of the booklet. The laminate may include inner and outer sections on a first face thereof. The inner section of the first face of the laminate may be affixed to the booklet. The outer section of the first face of the laminate may be affixed to the outer section of the liner to substantially enclose the booklet between the laminate and the liner. The method may further include adhesively affixing an IRC substantially adjacent the inner section on a second face of the laminate by means of a dry release adhesive.

The invention also provides a method of manufacturing a paperback rider instantly redeemable coupon (IRC). The method may include feeding a first web of material for a booklet through at least one print station, thereby defining a booklet web, and feeding a second web of material for an IRC through at least one print station, thereby defining an IRC material web. The method may further include automatically folding the booklet web, thereby defining a folded booklet web, combining the folded booklet web with a third web of a film having an adhesive backing layer, and laminating a fourth web of film to the folded booklet web to enclose the folded booklet web between the third and fourth webs of film, thereby defining an enclosed booklet web. The method may also include combining the enclosed booklet web with the IRC material web, combining a fifth web of film with the combined enclosed booklet and IRC material web, thereby defining a paperback rider IRC web, die cutting the paperback rider IRC web, and perforating sides of the paperback rider IRC web.

The invention yet further provides a method of manufacturing a paperback rider instantly redeemable coupon (IRC). The method may include feeding a first web of material for a booklet through at least one print station, thereby defining a booklet web, feeding a second web of material for an IRC through at least one print station, thereby defining an IRC material web, and automatically folding the booklet web, thereby defining a folded booklet web. The method may further include combining the folded booklet web with a third web of a film having an adhesive backing layer, laminating a fourth web of film to the folded booklet web to enclose the folded booklet web between the third and fourth webs of film, thereby defining an enclosed booklet web, perforating sides of the enclosed booklet web, utilizing a dry release adhesive to combine the enclosed booklet web with the IRC material web, thereby defining a paperback rider IRC web, and die cutting the paperback rider IRC web.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENT

Figure 1:
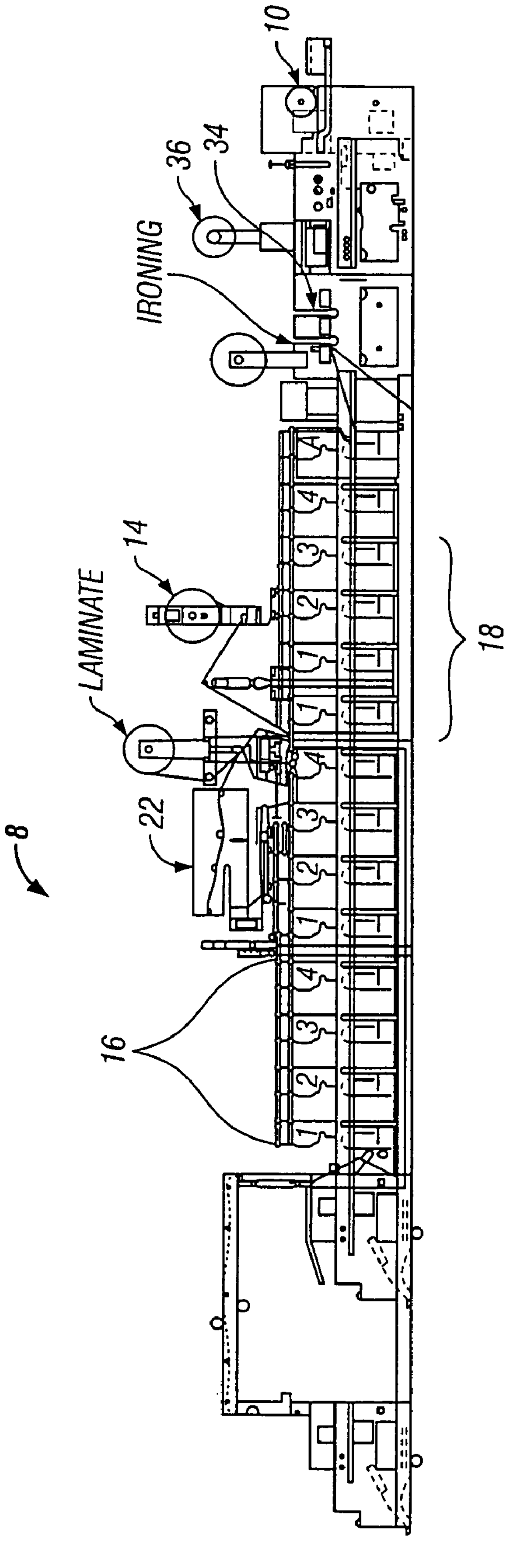
FIG. 1 is an illustrative view of a machine for applying an IRC to a booklet or leaflet label in a single pass according to the present invention.

Referring now to the drawings wherein like reference numerals designate corresponding parts throughout the several views, FIG. 1 illustrates an exemplary machine, generally designated IRC/label machine 8, which may be used to apply an IRC and booklet or leaflet label, generally designated paperback rider IRC 10 and shown in FIGS. 2-5.

Figure 2:
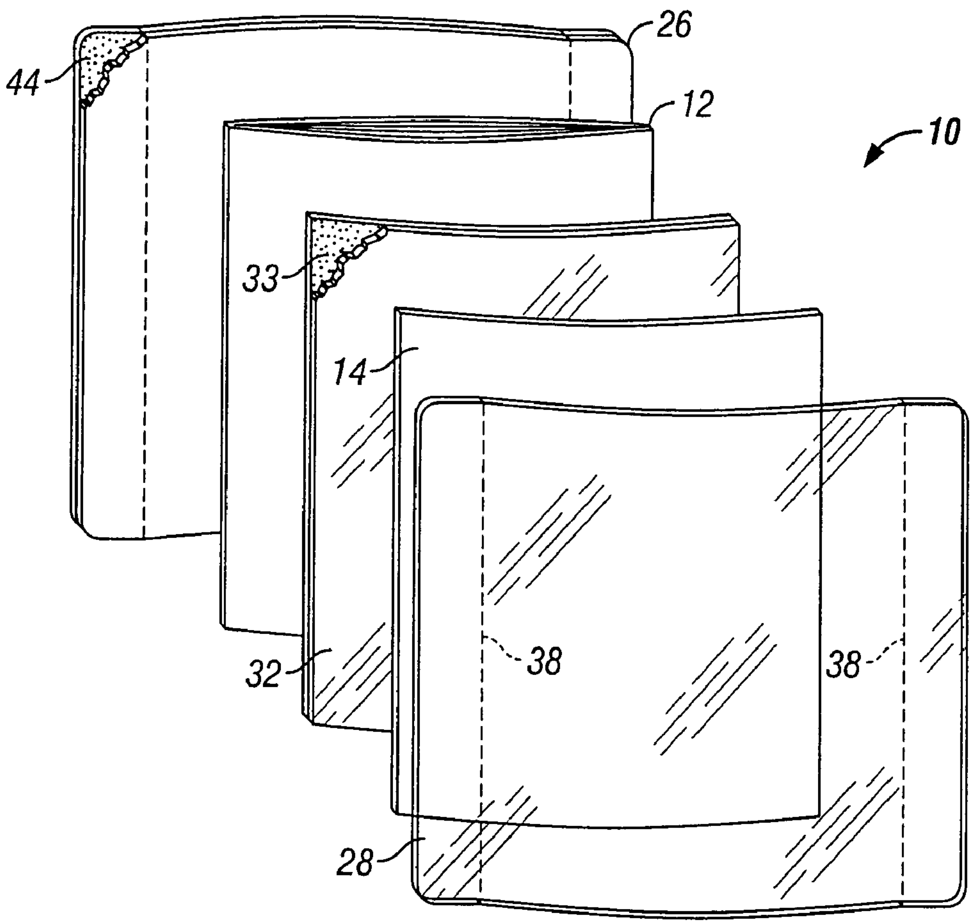
FIG. 2 is an exploded view of a first embodiment of an IRC releasably affixed to a booklet or leaflet label.
Figure 3:
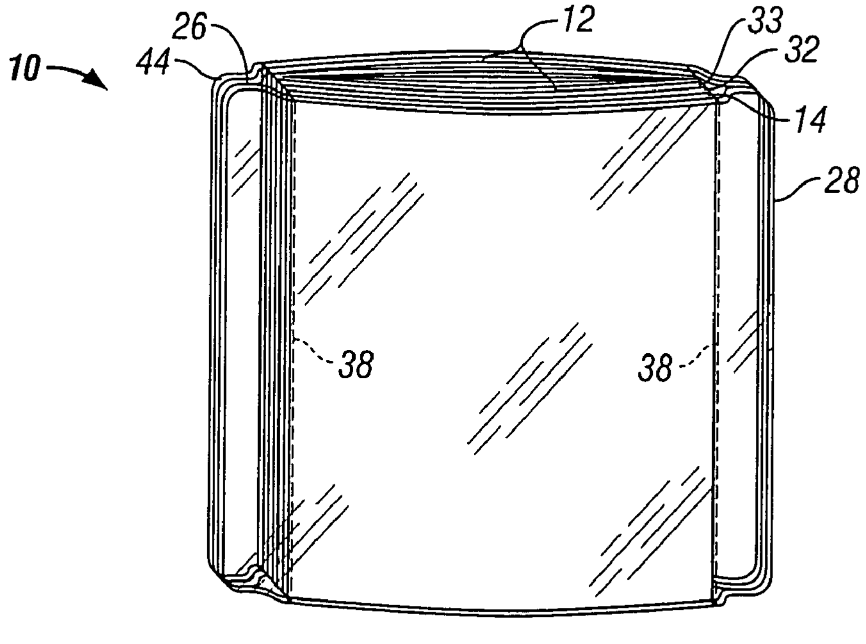
FIG. 3 is an assembled view of the IRC and booklet assembly of FIG. 2.

Referring to FIGS. 1-3, for IRC/label machine 8 illustrated in FIG. 1, a typical roll of label stock (not shown) of desired width may be placed on a spool. The roll of label stock may include a backing layer having a self adhesive clear or opaque film 26, having adhesive layer 44, attached thereto. Two rolls of clear film 28 and 32 of a desired width may each be placed on two additional spools. A roll of paper for the booklet or leaflet, generally designated 12, may be placed on a spool. The width of booklet 12 may be determined by the number of folds required to create the number of pages desired. For example, FIG. 2 illustrates a booklet 12 having four distinct folded sections. A second roll of paper for IRC 14 may be placed on a spool. IRC 14 may have a single layer, as illustrated in FIG. 2, or may include multiple folds as illustrated for booklet 12. The width of the second roll for IRC 14 may be determined by the size of the folded booklet or leaflet 12 upon which IRC 14 would be affixed.

In a first embodiment of paperback rider IRC 10, a first web of paper for booklet 12 may be fed through print stations, such as stations 16 of IRC/label machine 8, which print up to four colors on one side and one color on the other. Other print stations, such as stations 18, may be simultaneously used to print the front and back of a second web of IRC 14. Booklet 12 may then be automatically folded at a folding station, such as station 22. Clear or opaque self-adhesive film 26 may be provided for affixation of paperback rider IRC 10 to a product. The web for booklet 12 may be brought together with a third web of film 26. Booklet 12 may be permanently affixed to a top surface of film 26. A fourth web of clear film 32 having a self-adhesive backing layer 33 may be used to laminate the web for booklet 12 to the web for film 26. The web for film 26 and clear film 32 may be dimensioned larger than the length and width dimensions of booklet 12 so as to encase booklet 12 therein. The web for IRC 14 may then be brought together with the web for folded booklet 12. A fifth web may be used to laminate a clear film 28 over IRC 14 thereby affixing IRC 14 to booklet 12. The five webs may be separately or simultaneously "married" together and thereafter die cut, for example at a die-cutting station 34, through top clear film 28, IRC 14, clear film 32, booklet 12, and film 26 down to the backing layer (not shown). The waste matrix may be thereafter stripped and rewound to a spool at station 36. The resulting die cut pieces may then be passed through a station which perforates the two vertical sides 38 of the combined pieces. The finished roll may then be rewound. Using a label-applying machine installed in the user's production line, the finished roll illustrated in FIG. 3 may be automatically and rapidly affixed to a product or package (not shown).

A cashier may remove IRC 14 by grasping one corner and tearing along the two vertical perforations 38. The booklet 12, encased within film 26 and clear film 32, would be left intact still firmly secured to the package or product for later removal by the consumer.

Figure 4:
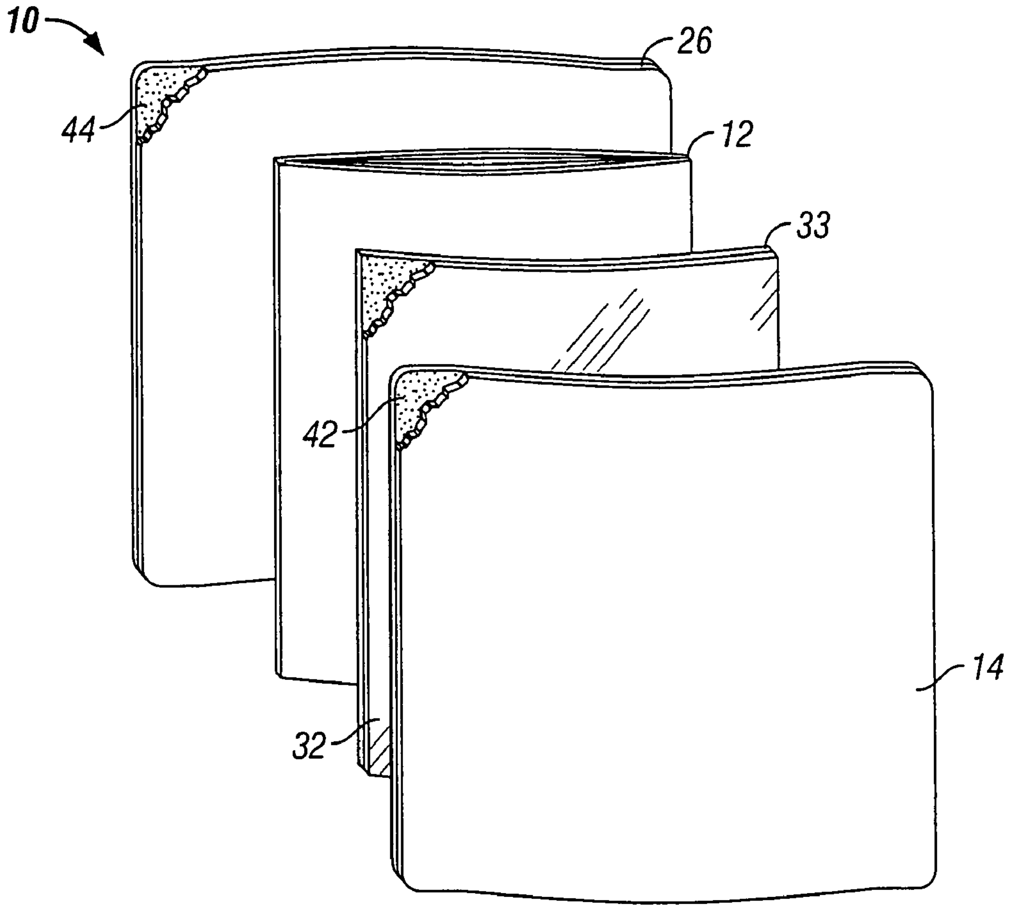
FIG. 4 is an exploded view of a second embodiment of an IRC releasably affixed to a booklet or leaflet label.
Figure 5:
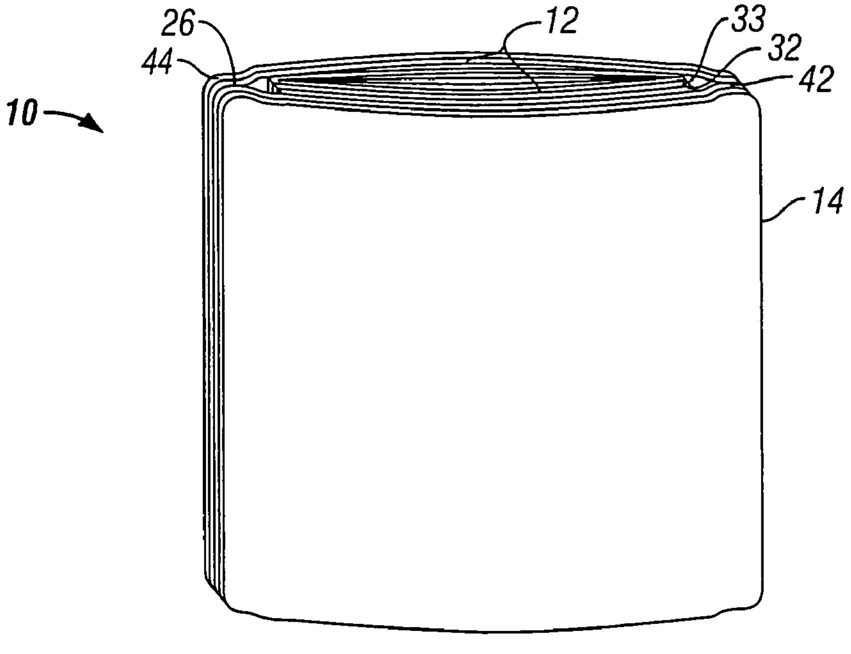
FIG. 5 is an assembled view of the IRC and booklet assembly of FIG. 4.

Referring to FIGS. 1, 4 and 5, in a second embodiment of paperback rider IRC 10 according to the present invention, IRC 14 may be affixed to clear film 32 laminated to booklet 12 with a dry release adhesive 42 immediately before the die cutting of the combined webs. The web for booklet 12 may be perforated before the web for IRC 14 is applied, and IRC 14 may be removed by grabbing an edge to which no glue has been applied.

Specifically, for the second embodiment of paperback rider IRC 10, a first web of paper for booklet 12 may be fed through print stations, such as stations 16 of IRC/label machine 8. Other print stations, such as stations 18, may be simultaneously used to print the front and back of IRC 14, which is on a second web. Booklet 12 may then be automatically folded at a folding station, such as station 22. Clear or opaque self-adhesive film 26 may be provided for affixation of paperback rider IRC 10 to a product. The web for booklet 12 may be brought together with a third web of film 26. Booklet 12 may be permanently affixed to a top surface of film 26. A fourth web of clear film 32 having a self-adhesive backing layer 33 may be used to laminate the web for booklet 12 to the web for film 26. The web for film 26 and clear film 32 may be dimensioned larger than the length and width dimensions of booklet 12 so as to encase booklet 12 therein. IRC 14 may be affixed to clear film 32, which is laminated to booklet 12, with a dry release adhesive 42 immediately before the die cutting of the combined webs. The web for booklet 12 may be perforated in a similar manner as illustrated in FIG. 2, before web for IRC 14 is applied. The four webs may be simultaneously "married" together and thereafter die cut, for example at a die-cutting station 34, through IRC 14, clear film 32, booklet 12 and film 26. The waste matrix may be thereafter stripped and rewound to a spool at station 36. The finished roll may then be rewound. Using a label-applying machine installed in the user's production line, the finished roll illustrated in FIG. 3 may be automatically and rapidly affixed to a product or package (not shown).

In a third embodiment of paperback rider IRC 10, IRC 14 may be made smaller than booklet 12. Booklet 12 may be printed on a conventional off-set press, folded and die cut. Booklet 12 may then be "onserted" to a self-adhesive, web liner stock or may be affixed to the web with dry release adhesive or laminated to the web with a self-adhesive, clear film substrate. The smaller IRC 14 may then be blown onto the web using a label-applying machine. IRC 14 and booklet 12 may also be printed on a flexographic press and "onserted" to a web.

In a fourth embodiment of paperback rider IRC 10, IRC 14 may be affixed to a booklet 12 of a different dimension, shape or design, as opposed to a booklet 12 of the same dimension. For example, booklet label 12 may be made of a different design or pattern, as opposed to IRC 14. Likewise, booklet label 12 may be made smaller than IRC 14.

It is apparent that instead of an IRC 14, a game-piece, an instant winner coupon, a warning, a scratch-off piece, a warranty, instructions, description, a collectible sticker and the like, may be used in lieu of IRC 14.

It is also apparent that for the first embodiment of paperback rider IRC 10 described above, instead of booklet 12 being permanently affixed to film 26, booklet 12 may be releasably affixed to film 26 by clean release adhesive, as described above for the second embodiment.

It is also apparent that IRC 14 may be in the form of a sticker such that IRC 14 could be removed and placed elsewhere. In this configuration, IRC 14 may be in the form of a cartoon figure, or may be a photograph of a movie actor, athlete and the like.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A method of manufacturing a paperback rider instantly redeemable coupon (IRC) in a single machine pass, said method comprising:

placing a booklet on a first face of a liner including inner and outer sections on said first face, said booklet including first and second surfaces, said first surface of said booklet being disposed substantially adjacent said inner section on said first face of said liner;

adhesively affixing a laminate to said second surface of said booklet, said laminate including inner and outer sections on a first face thereof, said inner section of said first face of said laminate being affixed to said booklet, said outer section of said first face of said laminate being affixed to said outer section of said liner to substantially enclose said booklet between said laminate and said liner;

adhesively affixing an IRC substantially adjacent said inner section on a second face of said laminate by means of a dry release adhesive; and perforating said outer sections of said liner, whereby said paperback rider IRC is manufactured in the single machine pass.

2. A method according to claim 1, said liner and said laminate being transparent.

3. A method of manufacturing a paperback rider instantly redeemable coupon (IRC) in a single machine pass, said method comprising:

placing a booklet on a first face of a liner including inner and outer sections on said first face, said booklet including first and second surfaces, said first surface of said booklet being disposed substantially adjacent said inner section on said first face of said liner;

adhesively affixing a first laminate to said second surface of said booklet, said first laminate including inner and outer sections on first and second faces thereof, said inner section of said first face of said first laminate being affixed to said booklet, said outer section of said first face of said first laminate being affixed to said outer section of said liner to substantially enclose said booklet between said first laminate and said liner;

disposing an IRC substantially adjacent said inner section on said second face of said first laminate;

adhesively affixing a second laminate on said IRC, said second laminate including inner and outer sections on a first face thereof, said inner section of said second laminate being affixed to said TRC and said outer section of said second laminate being affixed to said outer section of said second face of said first laminate; and perforating said outer sections of said liner and first and second laminates for permitting separation of said IRC from said paperback rider IRC, whereby said paperback rider IRC is manufactured in the single machine pass.

4. A method according to claim 3, said liner and said first and second laminates being transparent.

5. A method according to claim 3, said liner including a second face having an adhesive layer.

6. A method according to claim 3, said IRC being one of a coupon, a game-piece, an instant winner coupon, a warning, a scratch-off piece, a warranty, instructions, description, and a collectible sticker.

7. A method of manufacturing a paperback rider instantly redeemable coupon (IRC) in a single machine pass, said method comprising:

feeding a first web of material for a booklet through at least one print station, thereby defining a booklet web;

feeding a second web of material for an IRC through at least one print station, thereby defining an IRC material web;

automatically folding said booklet web, thereby defining a folded booklet web;

combining said folded booklet web with a third web of a film having an adhesive backing layer;

laminating a fourth web of film to said folded booklet web to enclose said folded booklet web between said third and fourth webs of film, thereby defining an enclosed booklet web;

combining said enclosed booklet web with said IRC material web;

combining a fifth web of film with said combined enclosed booklet and IRC material web, thereby defining a paperback rider IRC web, die cutting said paperback rider IRC web; and perforating sides of said paperback rider IRC web, whereby said paperback rider IRC is manufactured in the single machine pass.

8. A method according to claim 7, said third, fourth and fifth webs of film being transparent.

9. A method of manufacturing a paperback rider instantly redeemable coupon (IRC) in a single machine pass, said method comprising:

feeding a first web of material for a booklet through at least one print station, thereby defining a booklet web;

feeding a second web of material for an IRC through at least one print station, thereby defining an IRC material web;

automatically folding said booklet web, thereby defining a folded booklet web;

combining said folded booklet web with a third web of a film having an adhesive backing layer;

laminating a fourth web of film to said folded booklet web to enclose said folded booklet web between said third and fourth webs of film, thereby defining an enclosed booklet web;

perforating sides of said enclosed booklet web; and utilizing a dry release adhesive to combine said enclosed booklet web with said IRC material web, thereby defining a paperback rider IRC web, whereby said paperback rider IRC is manufactured in the single machine pass.

10. A method according to claim 9, further comprising:

die cutting said paperback rider IRC web.

11. A method according to claim 9, said third and fourth webs of film being transparent.

* * * * *